(12) United States Patent
Jia

(10) Patent No.: US 11,880,684 B2
(45) Date of Patent: Jan. 23, 2024

(54) RISC-V-BASED ARTIFICIAL INTELLIGENCE INFERENCE METHOD AND SYSTEM

(71) Applicant: INSPUR SUZHOU INTELLIGENT TECHNOLOGY CO., LTD., Jiangsu (CN)

(72) Inventor: Zhaorong Jia, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/246,662

(22) PCT Filed: Sep. 30, 2021

(86) PCT No.: PCT/CN2021/122287
§ 371 (c)(1),
(2) Date: Mar. 24, 2023

(87) PCT Pub. No.: WO2022/134729
PCT Pub. Date: Jun. 30, 2022

(65) Prior Publication Data
US 2023/0367593 A1    Nov. 16, 2023

(30) Foreign Application Priority Data

Dec. 24, 2020 (CN) .......................... 202011554149.6

(51) Int. Cl.
*G06F 9/30* (2018.01)
(52) U.S. Cl.
CPC ...... *G06F 9/30036* (2013.01); *G06F 9/30116* (2013.01)
(58) Field of Classification Search
None
See application file for complete search history.

(56) References Cited

U.S. PATENT DOCUMENTS 9,342,284 B2 * 5/2016 Hassanein ............. G06F 8/4442
2003/0221086 A1 11/2003 Simovich
(Continued)

FOREIGN PATENT DOCUMENTS

| CN | 107832804 A | 3/2018 |
| CN | 110007961 A | 7/2019 |

(Continued)

OTHER PUBLICATIONS

International search report for PCT/CN2021/122287 dated Dec. 29, 2021.

(Continued)

*Primary Examiner* — Eric Coleman
(74) *Attorney, Agent, or Firm* — Dennemeyer & Associates LLC; Victoria Friedman

(57) ABSTRACT

Provided are a Reduced Instruction Set Computer-Five (RISC-V)-based artificial intelligence inference method and system. The RISC-V-based artificial intelligence inference method includes the following steps: acquiring an instruction and data of artificial intelligence inference by means of a Direct Memory Access (DMA) interface, and writing the instruction and the data into a memory; acquiring the instruction from the memory and translating the instruction, and loading the data from the memory to a corresponding register on the basis of the instruction; in response to the instruction being a vector instruction, processing, by a convolution control unit, corresponding vector data in a vector processing unit on the basis of the vector instruction; and feeding back the processed vector data to complete inference.

20 Claims, 6 Drawing Sheets

(56) References Cited

U.S. PATENT DOCUMENTS

| | | | | |
|---|---|---|---|---|
| 2004/0181564 A1* | 9/2004 | MacInnis | ............... | H04N 19/42 |
| | | | | 375/E7.193 |
| 2012/0260061 A1* | 10/2012 | Reid | ................... | G06F 15/8076 |
| | | | | 712/3 |
| 2019/0079764 A1* | 3/2019 | Diamond | .............. | G06F 9/3887 |
| 2019/0325309 A1* | 10/2019 | Flamant | ................ | G06N 3/045 |
| 2020/0174707 A1* | 6/2020 | Johnson | .............. | G06F 12/0207 |
| 2020/0364334 A1* | 11/2020 | Pevny | ................... | G06F 21/567 |
| 2021/0089611 A1* | 3/2021 | Jiao | ........................ | G06N 3/084 |

FOREIGN PATENT DOCUMENTS

| | | |
|---|---|---|
| CN | 111027690 A | 4/2020 |
| CN | 111078287 A | 4/2020 |
| CN | 111158756 A | 5/2020 |
| CN | 112633505 A | 4/2021 |
| WO | 2017124648 A1 | 7/2017 |

OTHER PUBLICATIONS

Search report for Chinese application 202011554149.6, filed Dec. 24, 2020.

* cited by examiner

RISC-V-BASED ARTIFICIAL INTELLIGENCE INFERENCE METHOD AND SYSTEM

CROSS-REFERENCE TO RELATED APPLICATIONS

This is a 35 U.S.C. 371 National Stage Patent Application of International Application No. PCT/CN2021/122287, filed Sep. 30, 2021, which claims priority to Chinese application 202011554149.6, filed Dec. 24, 2020, each of which is hereby incorporated by reference in its entirety.

TECHNICAL FIELD

The present disclosure relates to the field of Artificial Intelligence (AI), more specifically, to a Reduced Instruction Set Computer-Five (RISC-V)-based artificial intelligence inference method and system.

BACKGROUND

At present, Artificial Intelligence (AI) chips are roughly classified as follows: from the perspective of application scenarios, the AI chips are mainly used in two directions, one is a cloud deployed in a data center, and the other is a terminal deployed in a consumer terminal. From the perspective of functions, the AI chips mainly do two things: one is Training, and the other is Inference. At present, the AI chips are respectively applied in the cloud and the terminal on a large scale. An AI chip in the cloud does two things simultaneously: training and inference. Training refers to "training" a corresponding system by using a large amount of marked data, so that the system can adapt to specific functions. For example, massive pictures of "cats" are given to the system, and the system is told that this is a "cat". Then, the system will "know" what a cat is. Inference refers to completing a task by using a trained system. Following the above example, you give a picture to the previously trained system, and the system comes to a conclusion that whether this picture is a cat or not.

At present, the AI chip in the cloud is mainly a Graphics Processing Unit (GPU). Since training requires a large amount of data, high computing power and high power consumption, large-scale heat dissipation is required. Training will be concentrated in the cloud for a long period of time, and the completion of Inference is also mainly concentrated in the cloud at present. However, with the efforts of more and more manufacturers, many applications will gradually be transferred to the terminal, for example, an autopilot chip which is widely applied at present.

A main purpose of completing Inference in the terminal is to meet a requirement of low delay of the terminal. The delay of cloud Inference is related to a network, which is generally large, and is difficult to meet the requirement of the terminal (such as auto pilot), meet the requirement of diversification of terminals, preliminary screen data of the terminal, and transmit valid data to the cloud.

RISC-V is an open source Instruction Set Architecture (ISA) based on a principle of a Reduced Instruction Set Computer (RISC). Compared with most instruction sets, a RISC-V instruction set may be freely used for any purpose, may allow anyone to design, manufacture and sell RISC-V chips and software without paying any company patent fee. Although this is not the first open source instruction set, it is of great significance because it is suitable for modern computing devices (such as a warehouse scale cloud computer, a high-end mobile phone, and a micro embedded system) due to its design. A designer considered the performance and power efficiency in these purposes. The instruction set also has a lot of supported software, which overcomes common weaknesses of a new instruction set.

The design of the RISC-V instruction set considers realities of small size, high speed, and low power consumption, but does not over-design a specific micro-architecture. The instruction set is a main communication bridge of computers because of locating between hardware and software. Therefore, if a well-designed instruction set is an open source and can be used by anyone, more resources can be reused, and the cost of the software can be greatly reduced. Such instruction set will also improve market competitiveness of hardware suppliers, because the hardware suppliers can divert more resources to design and reduce transactions supported by processing software. However, the RISC-V instruction set lacks a hardware design and software support of a processor, so it cannot be used for inference calculation of the AI chips.

For the problems that the RISC-V instruction set in a related art lacks the hardware design and the software support of the processor and cannot be used for inference calculation of the AI chips, there is no effective solution at present.

SUMMARY

In some implementations, the present disclosure discloses a RISC-V-based artificial intelligence inference method, which includes the following steps.

An instruction and data of artificial intelligence inference are acquired by means of a Direct Memory Access (DMA) interface, and the same are written into a memory.

The instruction is acquired from the memory and is translated, and the data is loaded from the memory to a corresponding register on the basis of the instruction.

In response to the instruction being a vector instruction, a convolution control unit processes corresponding vector data in a vector processing unit on the basis of the vector instruction.

The processed vector data is fed back to complete inference.

In response to the instruction being a vector instruction refers to determining that the instruction of the artificial intelligence inference includes the vector instruction, and responding to the vector instruction.

In some implementations, the memory includes a vector data memory, an instruction memory, and a scalar data memory. The register includes a vector register and a scalar register.

In some implementations, the step that the data is loaded from the memory to the corresponding register on the basis of the instruction includes that: a number of single vector operations is determined on the basis of environmental parameters; and the number of the single vector operations of the vector data is loaded to the vector register according to a vector loading instruction in the instruction.

In some implementations, the RISC-V-based artificial intelligence inference method further includes the following step: the convolution control unit determines the environmental parameters on the basis of a register configuration instruction in the instruction. The environmental parameters include a vector effective bit width, a number of vector registers in each group, a register bit width, and a number of vectors that need to be operated currently.

The step that the number of the single vector operations is determined on the basis of the environmental parameters includes that: a maximum number of vectors that are allowed to be operated is determined according to the register bit width, the vector effective bit width, and the number of the vector registers in each group, and a smaller value of the maximum number of the vectors that are allowed to be operated and the number of the vectors that need to be operated currently is determined as the number of the single vector operations.

In some implementations, the step that the convolution control unit processes the corresponding vector data in the vector processing unit on the basis of the vector instruction includes the following operations.

In response to that the vector register has data, a shadow register of the vector processing unit is empty, and the convolution control unit allows, the vector data is cached from the vector register to the shadow register.

The vector data is sequentially subjected to reordering processing and preprocessing in the shadow register and is stored in a multiplier input cache of the vector processing unit.

A multiplier array of the vector processing unit acquires the vector data from the multiplier input cache, so as to perform a multiplication operation under the control of the convolution control unit.

A product accumulator of the vector processing unit acquires the vector data from the multiplier array, so as to perform an accumulation operation under the control of the convolution control unit.

A vector activation unit of the vector processing unit acquires the vector data from the product accumulator, so as to perform a non-linear vector operation by using a lookup table under the control of the convolution control unit.

In some implementations, the RISC-V-based artificial intelligence inference method further includes the following steps. The convolution control unit configures a cache area of the lookup table for the vector activation unit on the basis of a lookup table activation instruction in the instruction.

The convolution control unit enables the vector data to be selectively subjected to the multiplication operation, the accumulation operation, or the non-linear vector operation on the basis of a real-time control instruction in the instruction.

In some implementations, the RISC-V-based artificial intelligence inference method further includes the following steps.

In response to the instruction being a scalar instruction, corresponding scalar data is processed in an arithmetic/logic operation unit on the basis of the scalar instruction.

The processed scalar data is fed back to complete inference.

In response to the instruction being a scalar instruction refers to determining that the instruction of the artificial intelligence inference further includes the scalar instruction, and responding to the scalar instruction.

In some implementations, a RISC-V-based artificial intelligence inference system is disclosed. The system includes a processor and a memory. The memory stores a computer-readable instruction that may be executed by the processor. When the computer-readable instruction is executed by the processor, the processor performs the following steps.

An instruction and data of artificial intelligence inference are acquired by means of a DMA interface, and the same are written into a memory.

The instruction is acquired from the memory and is translated, and the data is loaded from the memory to a corresponding register on the basis of the instruction.

In response to the instruction being a vector instruction, a convolution control unit processes corresponding vector data in a vector processing unit on the basis of the vector instruction.

The processed vector data is fed back to complete inference.

In response to the instruction being a vector instruction refers to determining that the instruction of the artificial intelligence inference includes the vector instruction, and responding to the vector instruction.

In some implementations, the memory includes a vector data memory, an instruction memory, and a scalar data memory. The register includes a vector register and a scalar register. The step that the data is loaded from the memory to a corresponding register on the basis of the instruction includes that: a number of single vector operations is determined on the basis of environmental parameters; and the number of the single vector operations of the vector data is loaded to the vector register according to a vector loading instruction in the instruction.

When processor executes the computer-readable instruction, the following steps are further implemented: the convolution control unit determines the environmental parameters on the basis of a register configuration instruction in the instruction. The environmental parameters include a vector effective bit width, a number of vector registers in each group, a register bit width, and a number of vectors that need to be operated currently. The step that the number of the single vector operations is determined on the basis of the environmental parameters includes that: a maximum number of vectors that are allowed to be operated is determined on the basis of the register bit width, the vector effective bit width, and the number of the vector registers in each group, and a smaller value of the maximum number of the vectors that are allowed to be operated and the number of the vectors that need to be operated currently is determined as the number of the single vector operations.

In some implementations, the step that the convolution control unit processes the corresponding vector data in the vector processing unit on the basis of the vector instruction includes that: in response to that the vector register has data, a shadow register of the vector processing unit is empty, and the convolution control unit allows, the vector data is cached from the vector register to the shadow register; the vector data is sequentially subjected to reordering processing and preprocessing in the shadow register and is stored in a multiplier input cache of the vector processing unit; a multiplier array of the vector processing unit acquires the vector data from the multiplier input cache, so as to perform a multiplication operation under the control of the convolution control unit; a product accumulator of the vector processing unit acquires the vector data from the multiplier array, so as to perform an accumulation operation under the control of the convolution control unit; and a vector activation unit of the vector processing unit acquires the vector data from the product accumulator, so as to perform a non-linear vector operation by using a lookup table under the control of the convolution control unit.

In some implementations, one or more non-volatile computer-readable storage media storing a computer-readable instruction are disclosed. When the computer-readable instruction is executed by one or more processors, the one or more processors perform the following steps.

An instruction and data of artificial intelligence inference are acquired by means of a DMA interface, and the same are written into a memory.

The instruction is acquired from the memory and is translated, and the data is loaded from the memory to a corresponding register on the basis of the instruction.

In response to the instruction being a vector instruction, a convolution control unit processes corresponding vector data in a vector processing unit on the basis of the vector instruction.

The processed vector data is fed back to complete inference.

In response to the instruction being a vector instruction refers to determining that the instruction of the artificial intelligence inference includes the vector instruction, and responding to the vector instruction.

BRIEF DESCRIPTION OF THE DRAWINGS

In order to illustrate the embodiments of the present disclosure or the technical solutions in the conventional art more clearly, the drawings used in the description of the embodiments or the conventional art will be briefly described below. It is apparent that the drawings in the following description are only some embodiments of the present disclosure, and other drawings can be obtained from those skilled in the art according to these drawings without any creative work.

DETAILED DESCRIPTION OF THE EMBODIMENTS

In order to make the purposes, technical solutions, and advantages of the present disclosure clearer, the embodiments of the present disclosure will be further described in detail below with reference to specific embodiments and the drawings.

It is to be noted that, all expressions using "first" and "second" in the embodiments of the present disclosure are for the purpose of distinguishing two non-identical entities with the same name or non-identical parameters. It may be seen that "first" and "second" are only for the convenience of expression, and should not be construed as a limitation to the embodiments of the present disclosure, which are not described one by one thereto in the subsequent embodiments.

Figure 1:
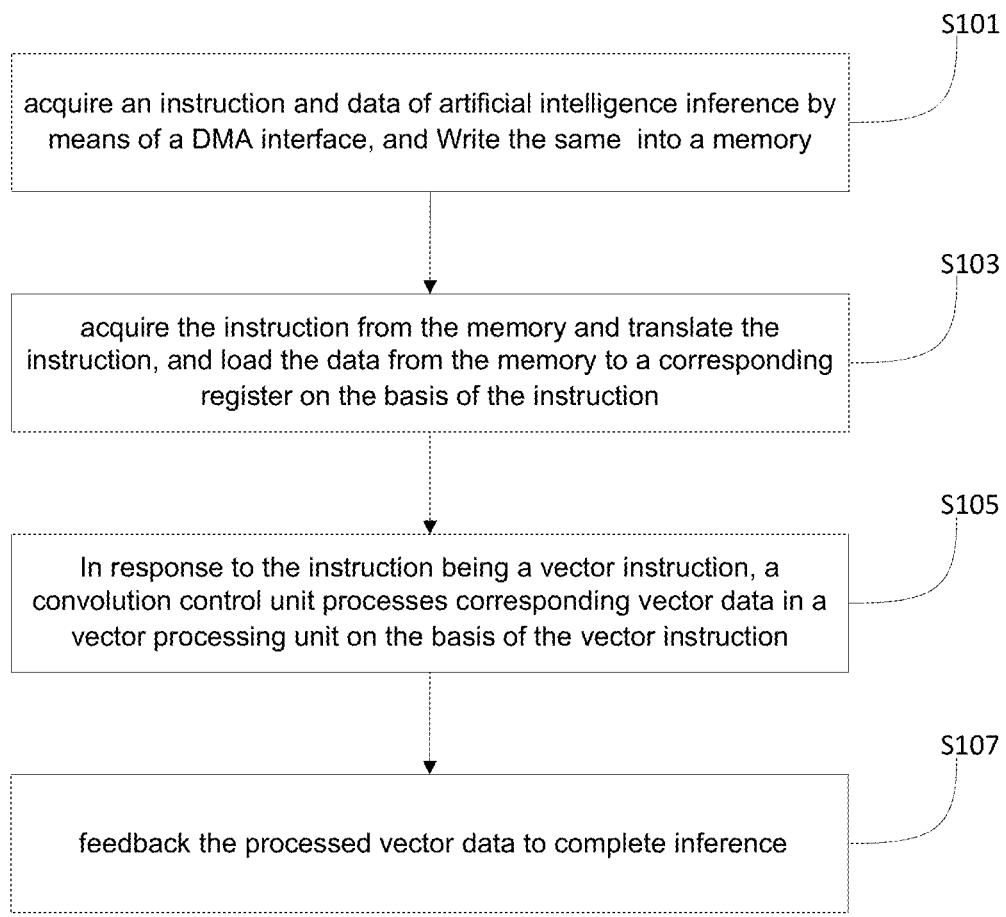
FIG. 1 is a schematic flowchart of a RISC-V-based artificial intelligence inference method according to some implementations of the present disclosure.

FIG. 1 shows a schematic flowchart of a RISC-V-based artificial intelligence inference method in one implementation.

The RISC-V-based artificial intelligence inference method, as shown in FIG. 1, includes the following steps.

At S101, an instruction and data of artificial intelligence inference are acquired by means of a DMA interface, and the same are written into a memory.

At S103, the instruction is acquired from the memory and is translated, and the data is loaded from the memory to a corresponding register on the basis of the instruction.

At S105, in response to the instruction being a vector instruction, a convolution control unit processes corresponding vector data in a vector processing unit on the basis of the vector instruction.

At S107, the processed vector data is fed back to complete inference.

The instruction in S103 refers to an instruction of the artificial intelligence inference. In response to the instruction being a vector instruction refers to determining that the instruction of the artificial intelligence inference includes the vector instruction, and responding to the vector instruction.

The present disclosure discloses AI chip architecture based on a RISC-V instruction set, which can complete a convolution calculation or a matrix calculation, and may also be used as an AI inference accelerator to assist a processor in completing convolution/matrix calculation. Because the architecture is fully compatible with a RISC-V reduced instruction set, the present disclosure may be further developed on a RISC-V software tool chain. Therefore, the development difficulty of the software tool chain is greatly reduced. A design core of the present disclosure is convolution operation architecture based on a RISC-V instruction set, which may complete a scalar operation, a vector operation, a convolution operation, a matrix operation, a non-linear activation operation, and the like, and can meet all calculation requirements of the artificial intelligence inference. The AI chips may also be interconnected through an on-chip mesh Network Operation Center (NoC) to form architecture with greater computing power and meet the requirements of different terminals on computing power.

Those of ordinary skill in the art may understand that all or part of the processes in the above implementations may be implemented by a computer-readable instruction to instruct related hardware. The foregoing computer-readable instruction may be stored in a non-volatile computer-readable storage medium. When the computer-readable instruction is executed, the processes of the RISC-V-based artificial intelligence inference method may be implemented. The foregoing non-volatile computer-readable storage medium may be a disk, an optical disk, a Read Only Storage Memory (ROM), a Random Access Memory (RAM), or the like. The embodiment of the foregoing computer program may achieve the same or similar effects with any of the foregoing method embodiments corresponding thereto.

In some implementations, the memory includes a vector data memory, an instruction memory, and a scalar data memory. The register includes a vector register and a scalar register.

In some implementations, the step that the data is loaded from the memory to the corresponding register on the basis of the instruction includes that: a number of single vector operations is determined on the basis of environmental parameters, so as to load the number of the single vector operations of the vector data to the vector register by using a vector loading instruction in the instruction (that is, the number of the single vector operations is determined on the basis of the environmental parameters, and the number of the single vector operations of the vector data is loaded to the vector register according to the vector loading instruction in the instruction).

In some implementations, the RISC-V-based artificial intelligence inference method further includes the following step: the convolution control unit determines the environmental parameters on the basis of a register configuration instruction in the instruction. The environmental parameters include a vector effective bit width, a number of vector registers in each group, a register bit width, and a number of vectors that need to be operated currently.

The step that the number of the single vector operations is determined on the basis of the environmental parameters includes that: a maximum number of vectors that are allowed to be operated is determined by dividing the register bit width by the vector effective bit width and multiplying by the number of the vector registers in each group, and a smaller value of the maximum number of the vectors that are allowed to be operated and the number of the vectors that need to be operated currently is determined as the number of the single vector operations.

In some implementations, the step that the convolution control unit processes the corresponding vector data in the vector processing unit on the basis of the vector instruction includes the following operations.

In response to that the vector register has data, a shadow register of the vector processing unit is empty, and the convolution control unit allows, the vector data is cached from the vector register to the shadow register.

The vector data is sequentially subjected to reordering processing and preprocessing in the shadow register and is stored in a multiplier input cache of the vector processing unit.

A multiplier array of the vector processing unit acquires the vector data from the multiplier input cache, so as to perform a multiplication operation under the control of the convolution control unit.

A product accumulator of the vector processing unit acquires the vector data from the multiplier array, so as to perform an accumulation operation under the control of the convolution control unit.

A vector activation unit of the vector processing unit acquires the vector data from the product accumulator, so as to perform a non-linear vector operation by using a lookup table under the control of the convolution control unit In some implementations, the method further includes that: the convolution control unit configures a cache area of the lookup table for the vector activation unit on the basis of a lookup table activation instruction in the instruction.

The convolution control unit enables the vector processing unit to selectively perform the multiplication operation, the accumulation operation, or the non-linear vector operation on the basis of a real-time control instruction in the instruction.

In some implementations, the RISC-V-based artificial intelligence inference method further includes performing the following steps.

In response to the instruction being a scalar instruction, corresponding scalar data is processed in an arithmetic/logic operation unit on the basis of the scalar instruction.

The processed scalar data is fed back to complete inference.

In response to the instruction being a scalar instruction refers to determining that the instruction of the artificial intelligence inference further includes a scalar instruction, and responding to the scalar instruction.

The following further describes specific implementations of the present disclosure according to specific embodiments.

Figure 2:
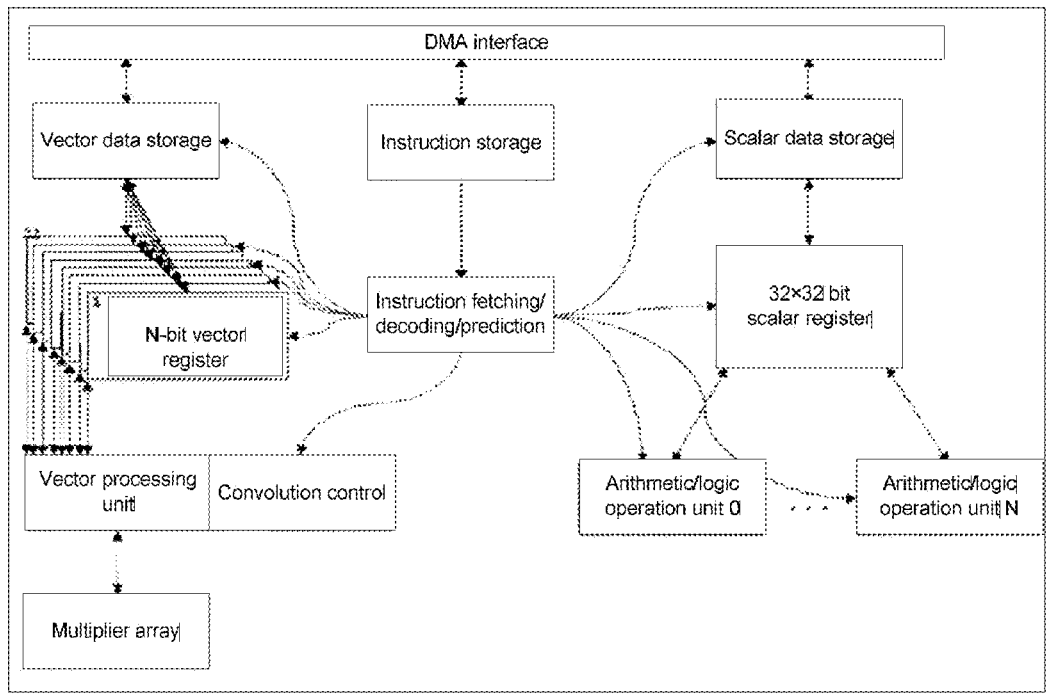
FIG. 2 is a schematic diagram of modules of a RISC-V-based artificial intelligence inference method according to some implementations of the present disclosure.

Reference is made to FIG. 2 for a schematic diagram of a top layer of architecture of the present disclosure. As shown in FIG. 2, the present disclosure includes a DAM interface, a scalar data storage unit, an instruction storage unit, a vector storage unit, an instruction fetching, instruction decoding, instruction prediction unit, 32 scalar registers, 32 vector registers, a control register, a scalar arithmetic logic unit (or called an arithmetic logic unit), a vector processing unit, a convolution control unit, and a multiplier array.

The DMA interface is responsible for loading an instruction and data in a Double Data Rate (DDR) Synchronous Dynamic Random Access Memory (SDRAM) to a corresponding storage unit. Scalar/vector/instruction storage units are all tightly coupled memories. Compared with a cache, the tightly coupled memories have low power consumption and fixed delay, does not have a missed cache, and can meet the requirements of the processor for real-time performance and reliability.

Figure 3:
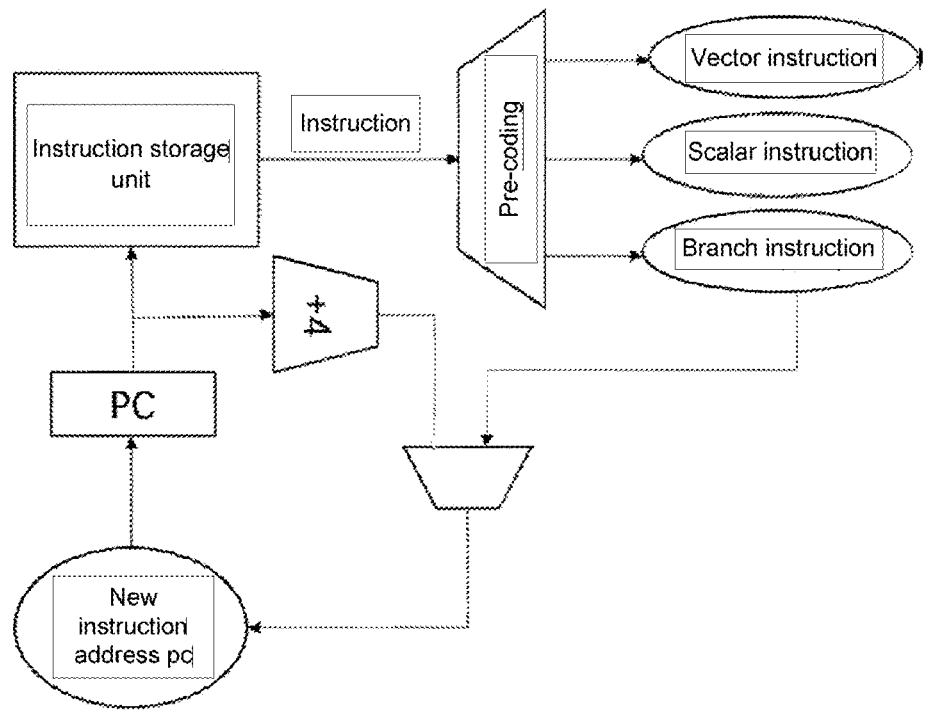
FIG. 3 is a flowchart of acquiring an instruction of a RISC-V-based artificial intelligence inference method according to some implementations of the present disclosure.

The instruction fetching/instruction decoding/instruction prediction units are units for reading the instruction, decoding the instruction, and predicting a branch in the instruction storage unit. The instruction fetching refers to reading the instruction, acquiring the instruction, or fetching the instruction. FIG. 3 shows a schematic flowchart of fetching the instruction (an instruction acquisition flowchart of the RISC-V-based artificial intelligence inference method). After the instruction is fetched, the processor determines whether the fetched instruction is the vector instruction or the scalar instruction, and then performs the operations of loading, executing, and writing back data of the vector/scalar. The instruction fetching/instruction decoding/instruction prediction units also have an instruction prediction function. After each instruction is fetched, an address of the next instruction will be generated. If a pre-decoding unit determines that this instruction is a branch instruction, the processor will recalculate the address of the next instruction, and fetches the address for later use.

The vector register/the scalar register is a registered specified in the RISC-V architecture. The scalar registers are 32 32-bit registers. The vector registers are 32 bit width-customizable vector registers. The scalar register has a function of caching a return address of a function call, a heap pointer, a temporary variable, a function parameter, a return value, and the like. The vector register is configured to cache a vector data variable, mask data, an intermediate calculation result, and the like. A vector functional unit (for example, a vector processing unit) and a scalar functional unit (for example, a scalar arithmetic logic unit) in the processor share a configuration register and a state register of the processor.

The scalar arithmetic logic unit (or called an arithmetic logic unit) completes a scalar arithmetic/logic operation. The vector processing unit mainly completes the vector operations in addition to convolution/multiplication, such as the functions of matrix transposition, deformation, non-linear operation, and vector accumulation. The convolution control unit is responsible for vector instruction decoding, module register configuration, non-linear function lookup table caching, vector logic control, and the like. A multiplier array unit mainly completes the functions of convolution and matrix multiplication, and 8 (which may be defined as another number) multiplier modules are integrated therein. Each module is integrated with 64 8-bit multipliers (the number of the multipliers may be self-defined according to the architecture).

Figure 4:
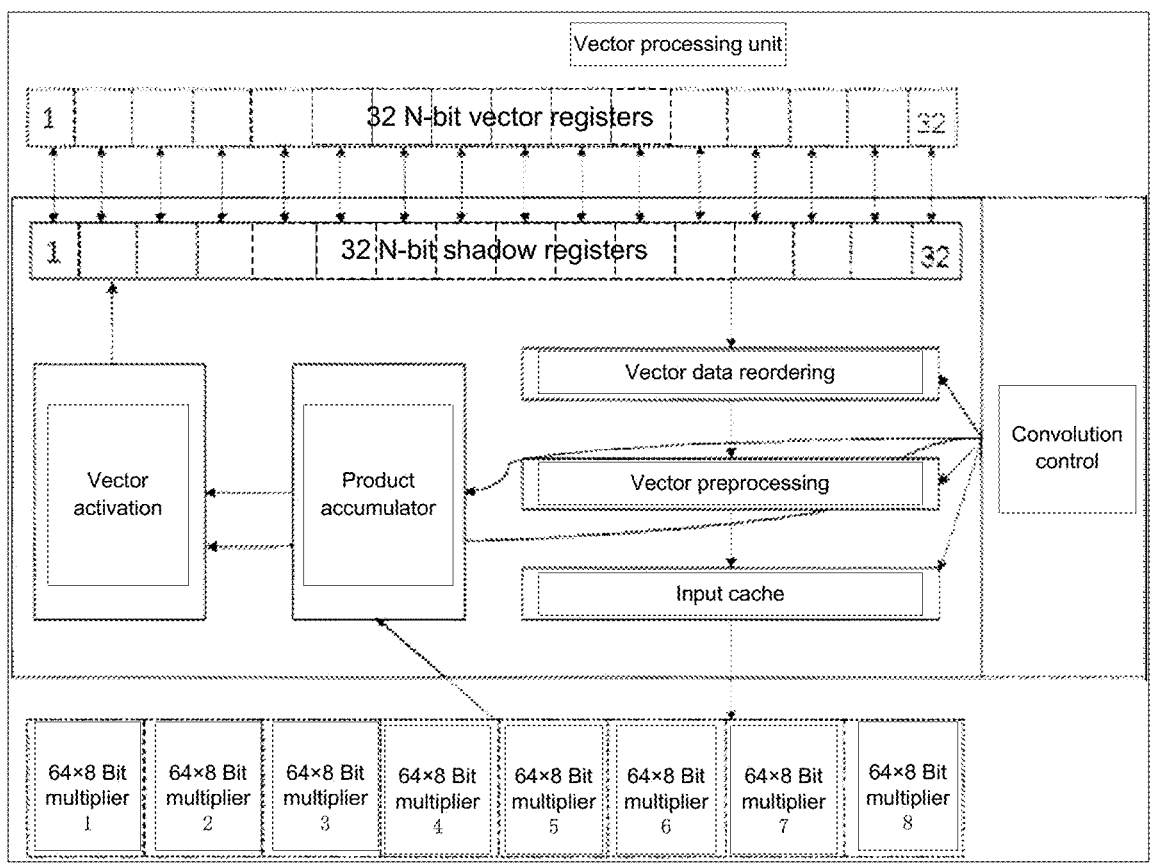
FIG. 4 is a structural diagram of a vector processing unit of a RISC-V-based artificial intelligence inference method according to some implementations of the present disclosure.

Reference is made to FIG. 4 for a structure of the vector processing unit in detail. The bit width N of the vector register is the length of the register determined when hardware is designed, for example, the length of N may be 128, 512, 1024, or the like. A data processing flow involved in the vector processing unit is as follows.

Figure 5:
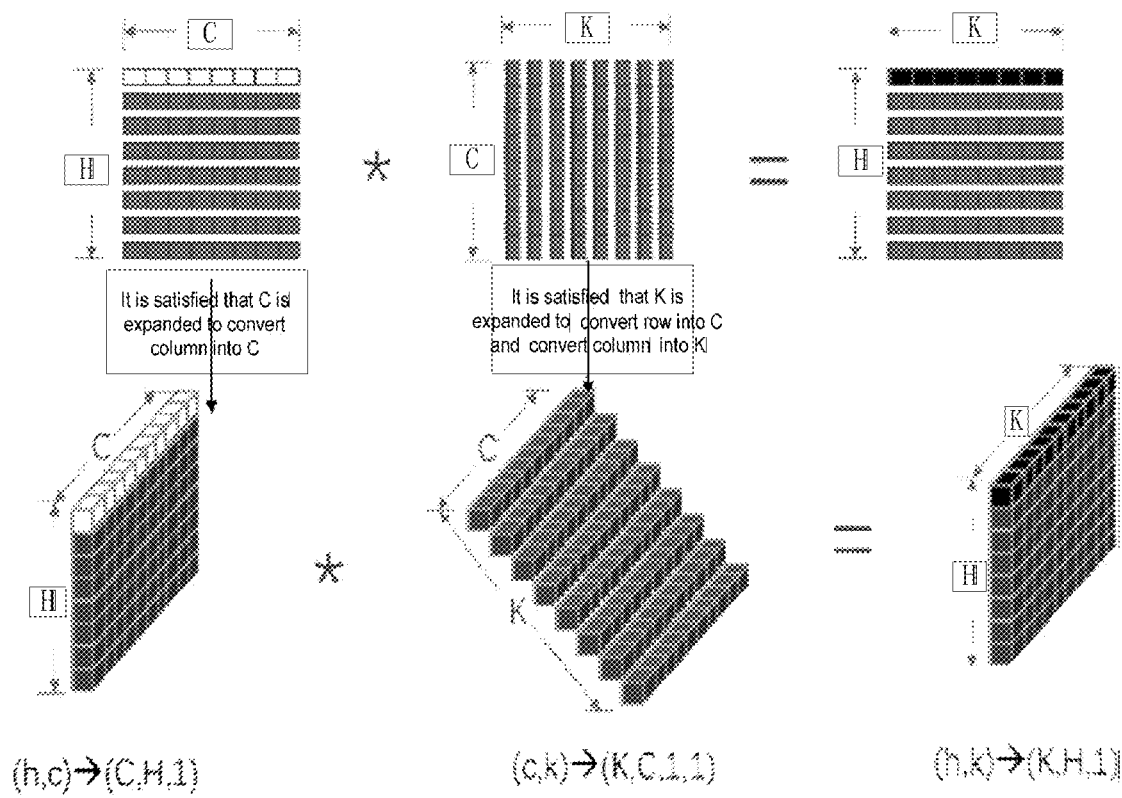
FIG. 5 is a flowchart of vector reordering of a RISC-V-based artificial intelligence inference method according to some implementations of the present disclosure.
Figure 6:
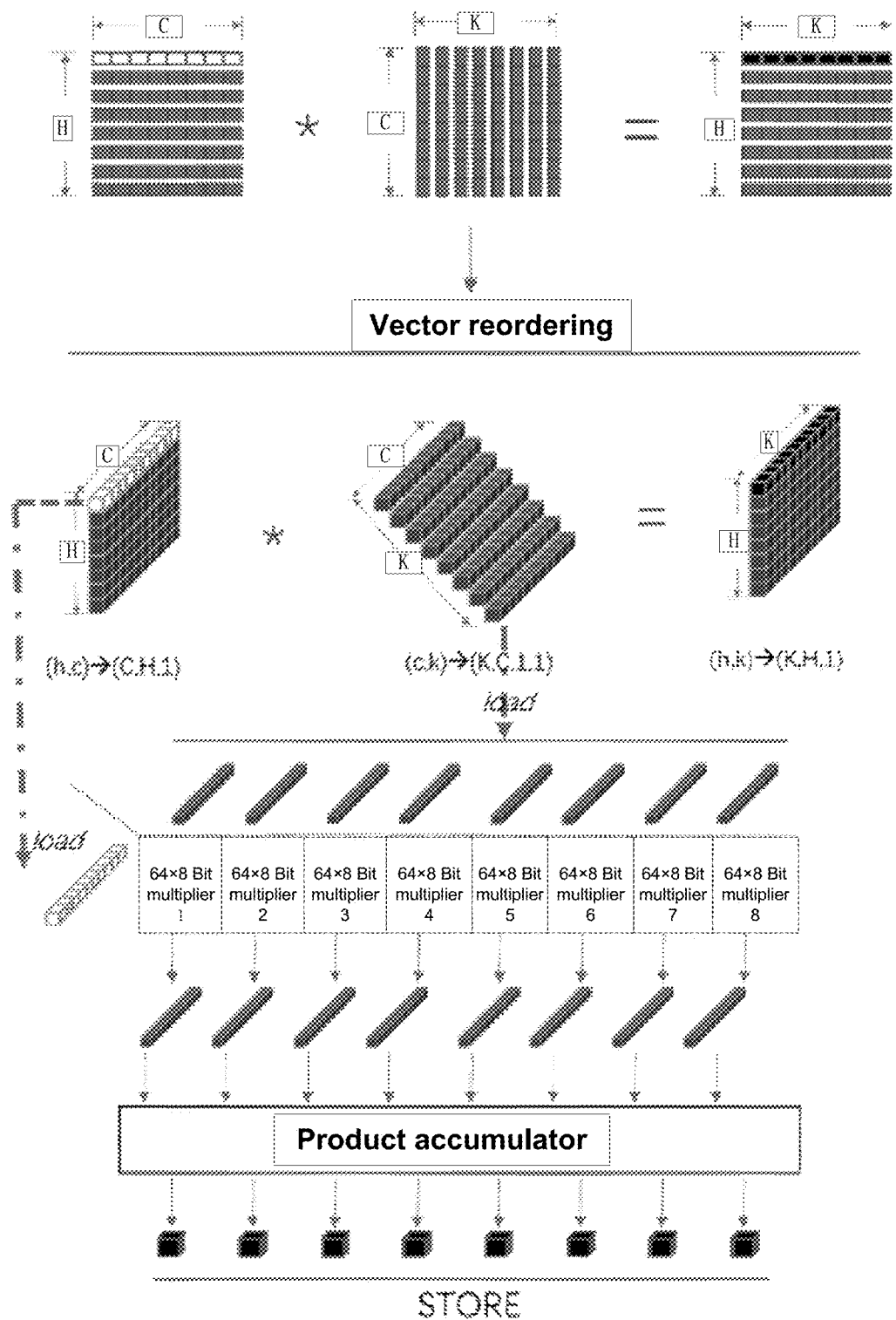
FIG. 6 is an overall flowchart of a vector processing unit of a RISC-V-based artificial intelligence inference method according to some implementations of the present disclosure.

1) The vector effective bit width SEW is set by using an instruction vsetvli (a RISC-V instruction set vector size setting instruction), the number of the registers in each group is LMUL, the number of the vectors that need to be operated currently Nw, and the maximum number of vectors that are allowed to be operated is Ne. Due to the limitation of the vector register, Ne is (N/SEW) *LMUL. If Nw>Ne, then the number of the vectors that are operated each time is Ne. If Nw is less than or equal to Ne, then the number of the vectors that are operated each time is Nw.
2) The vector data is loaded to the vector register by the vector loading instruction. The vector loading instruction may be vlen.v(n=8, 16, 32, . . . ).
3) The vector data is cached in the shadow register (or called a vector shadow register). The shadow register is configured to cache the data in the vector register, and is jointly controlled by the vector loading instruction, convolution control, and self-state. Only when there is new data in the vector register, convolution is allowed to be operated, and the shadow register is in an empty state, the data in the vector register is allowed to be loaded in the shadow register.
4) The vector in the shadow register is subjected to data reordering in a vector data reordering unit according to a configuration of the convolution control unit. A two-dimensional matrix is converted into a three-dimensional matrix in a manner as shown in FIG. 5. The utilization of matrix data is improved according to a principle of matrix multiplication. The vector data reordering unit also has a matrix transposition function and the like, and is responsible for enabling an arrangement of the data to meet a requirement of being directly called by the multiplier.
5) The vector preprocessing unit is responsible for performing scaling, offsetting, intercepting, and the like on the vector.
6) The processed data enters the multiplier input cache. The purpose of caching is that: as the matrix multiplication shown in the above figure, row data of a first matrix needs to be multiplied with all column data of a second matrix to obtain row data of an output matrix. In this process, a lot of data can be multiplexed, so an input cache unit is set to cache multiplexed data. This mechanism can effectively reduce the number of accesses to the DDR by the processor and reduce the requirement of the processor for the bandwidth of the DDR.
7) The cached data enters the multiplier array to perform the multiplication operation, so as to obtain product data. The multiplier array is set according to a maximum value of data volume that can be loaded by the vector register, which can meet a peak requirement of data throughput, avoids redundancy, and fully uses hardware resources without waste.
8) The product data is input a product accumulator to perform the accumulation operation. An accumulation cache unit is configured in the product accumulator to store an intermediate result. When an accumulated value is a final output result, it will be output to the next unit.
9) The vector activation unit is responsible for the nonlinear vector operation by a lookup table method. By a configuration of the lookup table, parameters are loaded to the cache area of the vector activation unit through the data loading instruction.
10) A final calculation result is stored in a corresponding position through the vector register under the control of a vector storage instruction. The overall calculation process is controlled by the convolution control unit, and an unnecessary link may be set as bypass. The overall process is completely shown in FIG. 6.

Figure 7:
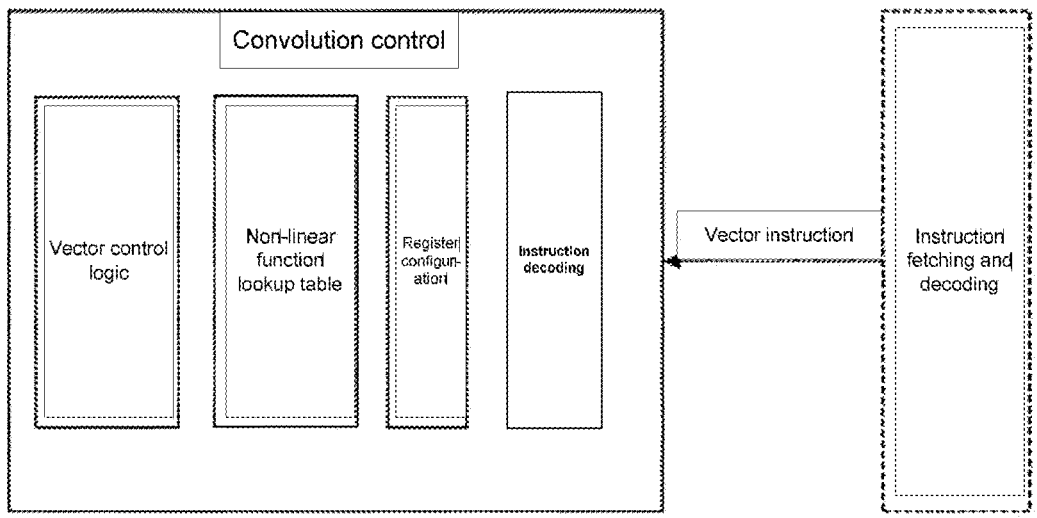
FIG. 7 is a schematic diagram of a convolution control unit of a RISC-V-based artificial intelligence inference method according to some implementations of the present disclosure.

Reference is made to FIG. 7 for a structure of the convolution control unit in detail. The convolution control unit controls the overall convolution/matrix multiplication process according to the vector instruction. The vector instruction sent by an instruction fetching and decoding unit is decoded in the convolution control unit.

1) If the vector instruction is a convolution control register configuration command, then a register is configured. The configuration register is mapped to storage space of the processor. When an addressing of the vector instruction is an address field in this space, the vector instruction is considered as a command of the configuration register, and registers are distinguished according to addresses. The configuration register includes the registers of different unit modules, for example, the registers of a data size, a data input dimension, a data output dimension, whether to transpose, and the like of a vector data reordering unit, and for another example, the registers of a data scaling coefficient, a data offset coefficient, an interception coefficient, and the like of the vector preprocessing unit.
2) If the vector instruction is to configure a lookup table of the vector activation unit, then the data is directly configured to a lookup table cache area of the vector activation unit.
3) If the vector instruction is a convolution real-time control instruction, for example, data multiplication, data loading, and data storage instructions, then real-time control is performed according to the instruction.

Figure 8:
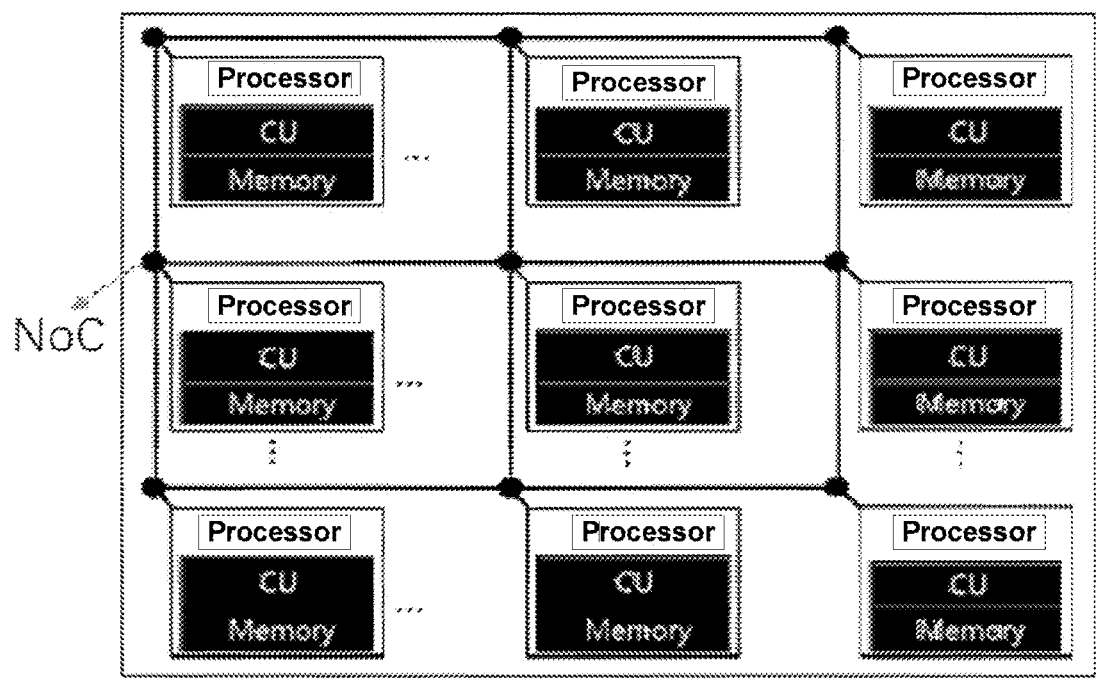
FIG. 8 is a diagram of an on-chip interconnection structure of processors of a RISC-V-based artificial intelligence inference method according to some implementations of the present disclosure.

In addition, a plurality of processors of the present disclosure may be interconnected through an on-chip mesh NoC to form architecture with greater computing power, for example, an Artificial Intelligence Processing Unit (AIPU), and reference is made to FIG. 8 for its structure in detail. The number of the processors may be large or small, which is very flexible, and may be used in different hardware scale applications. The processor architecture interconnected by a network support a Single Instruction Multiple Data (SIMD) mode or a Multiple Instruction Multiple Data (MIMD) mode, and software programming is more flexible.

It can be seen from the above embodiments that, according to the RISC-V-based artificial intelligence inference method, through the technical solution that the instruction and the data of the artificial intelligence inference are acquired by means of a DMA interface, the instruction is acquired from the memory and is translated, the data is loaded from the memory to a corresponding register on the basis of the instruction, in response to the instruction being a vector instruction (that is, it is determined that the instruction of the artificial intelligence inference includes a vector instruction, and the vector instruction is responded), the convolution control unit processes corresponding vector data in a vector processing unit on the basis of the vector instruction, and the processed vector data is fed back to complete the inference, the RISC-V instruction set may be applied to an inference calculation, which facilitates the application and landing of the artificial intelligence inference.

It is to be particularly noted that various steps in various embodiments of the above RISC-V-based artificial intelligence inference method may be crossed with, replaced with, added to, or deleted from each other, so that these rational permutation and combination transformations for the RISC-V-based artificial intelligence inference method should also belong to the scope of protection of the present disclosure, and the scope of protection of the present disclosure should not be limited to the foregoing embodiments.

In some implementations, the present disclosure discloses a RISC-V-based artificial intelligence inference system, which facilitates the application and landing of the artificial intelligence inference. The system includes a processor and a memory. The memory stores a computer-readable instruction that may be executed by the processor. When the computer-readable instruction is executed by the processor, the processor performs the following steps.

An instruction and data of artificial intelligence inference are acquired by means of a DMA interface, and the same are written into a memory.

The instruction is acquired from the memory and is translated, and the data is loaded from the memory to a corresponding register on the basis of the instruction.

In response to the instruction being a vector instruction, a convolution control unit processes corresponding vector data in a vector processing unit on the basis of the vector instruction.

The processed vector data is fed back to complete inference.

In response to the instruction being a vector instruction refers to determining that the instruction of the artificial intelligence inference includes the vector instruction, and responding to the vector instruction.

In some implementations, the memory includes a vector data memory, an instruction memory, and a scalar data memory. The register includes a vector register and a scalar register. When the computer-readable instruction is executed by the processor, the step that the data is loaded from the memory to the corresponding register on the basis of the instruction includes that: a number of single vector operations is determined on the basis of environmental parameters, so that the number of the single vector operations of the vector data is loaded to the vector register by using the vector loading instruction in the instruction (that is, the number of the single vector operations is determined on the basis of the environmental parameters, and the number of the single vector operations of the vector data is loaded to the vector register according to the vector loading instruction in the instruction).

When the computer-readable instruction is executed by the processor, the following steps may also be implemented: the convolution control unit determines the environmental parameters on the basis of a register configuration instruction in the instruction. The environmental parameters include a vector effective bit width, a number of vector registers in each group, a register bit width, and a number of vectors that need to be operated currently. When the computer-readable instruction is executed by the processor, the step that the number of the single vector operations is determined on the basis of the environmental parameters includes that: a maximum number of vectors that are allowed to be operated is determined by dividing the register bit width by the vector effective bit width and multiplying by the number of the vector registers in each group, and a smaller value of the maximum number of the vectors that are allowed to be operated and the number of the vectors that need to be operated currently is determined as the number of the single vector operations.

In some embodiments, when the computer-readable instruction is executed by the processor, the step that the convolution control unit processes the corresponding vector data in the vector processing unit on the basis of the vector instruction includes that: in response to that the vector register has data, a shadow register of the vector processing unit is empty, and the convolution control unit allows, the vector data is cached from the vector register to the shadow register; the vector data is sequentially subjected to reordering processing and preprocessing in the shadow register and is stored in a multiplier input cache of the vector processing unit; a multiplier array of the vector processing unit acquires the vector data from the multiplier input cache, so as to perform a multiplication operation under the control of the convolution control unit; a product accumulator of the vector processing unit acquires the vector data from the multiplier array, so as to perform an accumulation operation under the control of the convolution control unit; and a vector activation unit of the vector processing unit acquires the vector data from the product accumulator to perform a non-linear vector operation by using a lookup table under the control of the convolution control unit.

In some implementations, when the computer-readable instruction is executed by the processor, the following steps are further implemented.

The convolution control unit configures a cache area of the lookup table for the vector activation unit on the basis of a lookup table activation instruction in the instruction.

The convolution control unit enables the vector data to be selectively subjected to the multiplication operation, the accumulation operation, or the non-linear vector operation on the basis of a real-time control instruction in the instruction.

In some implementations, when the computer-readable instruction is executed by the processor, the following steps are further implemented.

In response to the instruction being a scalar instruction, corresponding scalar data is processed in an arithmetic/logic operation unit on the basis of the scalar instruction.

The processed scalar data is fed back to complete inference.

In response to the instruction being a vector instruction refers to determining that the instruction of the artificial intelligence inference includes the vector instruction, and responding to the vector instruction. In response to the instruction being a scalar instruction refers to determining that the instruction of the artificial intelligence inference further includes the scalar instruction, and responding to the scalar instruction.

It can be seen from the above embodiments that, according to the system provided by the present disclosure, through the technical solution that the instruction and the data of the artificial intelligence inference are acquired by means of a DMA interface, and the same are written into the memory; the instruction is acquired from the memory and is translated, the data is loaded from the memory to the corresponding register on the basis of the instruction; in response to the instruction being the vector instruction, the convolution control unit processes corresponding vector data in the vector processing unit on the basis of the vector instruction; and the processed vector data is fed back to complete the inference, the RISC-V instruction set may be applied to the inference calculation of the AI chips, and the implementation of the applications of the artificial intelligence inference are facilitated.

It is to be particularly noted that working processes of various modules in the embodiment of the above RISC-V-based artificial intelligence inference system are specifically described by using the embodiments of the RISC-V-based artificial intelligence inference method. A person skilled in the art may easily figure out application of these modules to other embodiments of the RISC-V-based artificial intelligence inference method. Of course, various steps in the embodiment of the RISC-V-based artificial intelligence inference method may be crossed with, replaced with, added to, or deleted from each other, so that these rational permutation and combination transformations for the RISC-V-based artificial intelligence inference system should also belong to the scope of protection of the present disclosure, and the scope of protection of the present disclosure should not be limited to the foregoing embodiments.

In some implementations, one or more non-volatile computer-readable storage media storing a computer-readable instruction are disclosed. When the computer-readable instruction is executed by one or more processors, the one or more processors perform the following steps.

An instruction and data of artificial intelligence inference are acquired by means of a DMA interface, and the same are written into a memory.

The instruction is acquired from the memory and is translated, and the data is loaded from the memory to a corresponding register on the basis of the instruction.

In response to the instruction being a vector instruction, a convolution control unit processes corresponding vector data in a vector processing unit on the basis of the vector instruction.

The processed vector data is fed back to complete inference.

In response to the instruction being a vector instruction refers to determining that the instruction of the artificial intelligence inference includes the vector instruction, and responding to the vector instruction.

In some implementations, when the computer-readable instruction is executed by the processor, the step that the data is loaded from the memory to the corresponding register on the basis of the instruction includes that: a number of single vector operations is determined on the basis of environmental parameters, so that the number of the single vector operations of the vector data is loaded to the vector register by using the vector loading instruction in the instruction (that is, the number of the single vector operations is determined on the basis of the environmental parameters, and the number of the single vector operations of the vector data is loaded to the vector register according to the vector loading instruction in the instruction).

In some implementations, when the computer-readable instruction is executed by the processor, the following steps are implemented. The convolution control unit determines the environmental parameters on the basis of a register configuration instruction in the instruction. The environmental parameters include a vector effective bit width, a number of vector registers in each group, a register bit width, and a number of vectors that need to be operated currently.

In some implementations, when the computer-readable instruction is executed by the processor, the step that the number of the single vector operations is determined on the basis of the environmental parameters includes that: a maximum number of vectors that are allowed to be operated is determined by dividing the register bit width by the vector effective bit width and multiplying by the number of the vector registers in each group, and a smaller value of the maximum number of the vectors that are allowed to be operated and the number of the vectors that need to be operated currently is determined as the number of the single vector operations.

In some implementations, when the computer-readable instruction is executed by the processor, the step that the convolution control unit processes the corresponding vector data in the vector processing unit on the basis of the vector instruction includes the following operations.

In response to that the vector register has data, a shadow register of the vector processing unit is empty, and the convolution control unit allows, the vector data is cached from the vector register to the shadow register.

The vector data is sequentially subjected to reordering processing and preprocessing in the shadow register and is stored in a multiplier input cache of the vector processing unit.

A multiplier array of the vector processing unit acquires the vector data from the multiplier input cache, so as to perform a multiplication operation under the control of the convolution control unit.

A product accumulator of the vector processing unit acquires the vector data from the multiplier array, so as to perform an accumulation operation under the control of the convolution control unit.

A vector activation unit of the vector processing unit acquires the vector data from the product accumulator, so as to perform a non-linear vector operation by using a lookup table under the control of the convolution control unit.

In some implementations, when the computer-readable instruction is executed by the processor, the following steps are further implemented.

The convolution control unit configures a cache area of the lookup table for the vector activation unit on the basis of a lookup table activation instruction in the instruction.

The convolution control unit enables the vector data to be selectively subjected to the multiplication operation, the accumulation operation, or the non-linear vector operation on the basis of a real-time control instruction in the instruction.

In some implementations, when the computer-readable instruction is executed by the processor, the following steps are further implemented.

In response to the instruction being a scalar instruction, corresponding scalar data is processed in an arithmetic/logic operation unit on the basis of the scalar instruction.

The processed scalar data is fed back to complete inference. In response to the instruction being a scalar instruction refers to determining that the instruction of the artificial intelligence inference further includes the scalar instruction, and responding to the scalar instruction.

The above are exemplary embodiments of the present disclosure, but it should be noted that, various changes and modifications may be made without departing from the scope disclosed in the embodiments of the present disclosure as defined in the claims. The functions, steps and/or actions of the method claims in accordance with the disclosed embodiments described herein need not be performed in any particular order. In addition, although elements disclosed in the embodiments of the present disclosure may be described or claimed in the singular, unless explicitly limited to the singular, the plural may also be construed.

Those of ordinary skill in the art should understand that, the discussion of any of the above embodiments is merely exemplary, and is not intended to imply that the scope (including the claims) disclosed in the embodiments of the present disclosure is limited to these examples. Under the idea of the embodiments of the present disclosure, the technical features in the above embodiments or different embodiments can also be combined. In addition, there are many other changes in different aspects of the above embodiments of the present disclosure, which are not provided in detail for the sake of brevity. Therefore, any omissions, modifications, equivalent replacements, improvements and the like made within the spirit and principle of the embodiments of the present disclosure shall all fall within the protection scope of the embodiments of the present disclosure.

What is claimed is:

1. A Reduced Instruction Set Computer-Five (RISC-V)-based artificial intelligence inference method, comprising:
    acquiring an instruction and data of artificial intelligence inference by means of a Direct Memory Access (DMA) interface, and writing the instruction and the data into a memory;
    acquiring the instruction from the memory and translating the instruction, and loading the data from the memory to a corresponding register on the basis of the instruction;
    in response to the instruction being a vector instruction, processing, by a convolution control unit, corresponding vector data in a vector processing unit on the basis of the vector instruction; and
    feeding back the processed vector data to complete inference.

2. The method according to claim 1, wherein the memory comprises a vector data memory, an instruction memory, and a scalar data memory; and the register comprises a vector register and a scalar register.

3. The method according to claim 2, wherein the step of loading the data from the memory to the corresponding register on the basis of the instruction comprises:
    determining a number of single vector operations on the basis of environmental parameters; and
    loading the number of the single vector operations of the vector data to the vector register according to a vector loading instruction in the instruction.

4. The method according to claim 3, further comprising:
    determining, by the convolution control unit, the environmental parameters on the basis of a register configuration instruction in the instruction, wherein the environmental parameters comprise a vector effective bit width, a number of vector registers in each group, a register bit width, and a number of vectors that need to be operated currently;
    the step of determining the number of the single vector operations on the basis of the environmental parameters comprises:
    determining a maximum number of vectors that are allowed to be operated according to the register bit width, the vector effective bit width, and the number of the vector registers in each group, and
    determining a smaller value of the maximum number of the vectors that are allowed to be operated and the number of the vectors that need to be operated currently as a number of the single vector operations.

5. The method according to claim 1, wherein the step of processing, by the convolution control unit, the corresponding vector data in the vector processing unit on the basis of the vector instruction comprises:
    in response to that the vector register has data, a shadow register of the vector processing unit is empty, and the convolution control unit allows, caching the vector data from the vector register to the shadow register;
    sequentially performing reordering processing and preprocessing on the vector data in the shadow register, and storing the vector data in a multiplier input cache of the vector processing unit;
    acquiring, by a multiplier array of the vector processing unit, the vector data from the multiplier input cache, so as to perform a multiplication operation under the control of the convolution control unit;
    acquiring, by a product accumulator of the vector processing unit, the vector data from the multiplier array, so as to perform an accumulation operation under the control of the convolution control unit; and
    acquiring, by a vector activation unit of the vector processing unit, the vector data from the product accumulator, so as to perform a non-linear vector operation by using a lookup table under the control of the convolution control unit.

6. The method according to claim 5, further comprising:
    configuring, by the convolution control unit, a cache area of the lookup table for the vector activation unit on the basis of a lookup table activation instruction in the instruction; and
    enabling, by the convolution control unit, the vector data to be selectively subjected to the multiplication operation, the accumulation operation, or the non-linear vector operation on the basis of a real-time control instruction in the instruction.

7. The method according to claim 1, further comprising:
    in response to the instruction being a scalar instruction, processing corresponding scalar data in an arithmetic/logic operation unit on the basis of the scalar instruction; and
    feeding back the processed scalar data to complete the inference.

8. A Reduced Instruction Set Computer-Five (RISC-V)-based artificial intelligence inference system, comprising a processor and a memory, wherein
    the memory is configured to store a computer-readable instruction that can be executed by the processor;
    the processor is configured to, when the computer-readable instruction is executed by the processor, perform the following steps:
    acquiring an instruction and data of artificial intelligence inference by means of a Direct Memory Access (DMA) interface, and writing the instruction and the data into the memory;
    acquiring the instruction from the memory and translating the instruction, and loading the data from the memory to a corresponding register on the basis of the instruction;
    in response to the instruction being a vector instruction, processing, through a convolution control unit, corresponding vector data in a vector processing unit on the basis of the vector instruction; and
    feeding back the processed vector data to complete inference.

9. The system according to claim 8, wherein the memory comprises a vector data memory, an instruction memory, and a scalar data memory; and the register comprises a vector register and a scalar register; the loading the data from the memory to a corresponding register on the basis of the instruction comprises: determining a number of single vector operations on the basis of environmental parameters; loading the number of the single vector operations of the vector data to the vector register according to a vector loading instruction in the instruction;

the processor is further configured to perform the following steps when executing the computer-readable instruction: determining, by the convolution control unit, the environmental parameters on the basis of a register configuration instruction in the instruction, wherein the environmental parameters comprise a vector effective bit width, a number of vector registers in each group, a register bit width, and a number of vectors that need to be operated currently; and the step of determining the number of the single vector operations on the basis of the environmental parameters comprises: determining a maximum number of vectors that are allowed to be operated according to the register bit width, the vector effective bit width, and the number of the vector registers in each group, and determining a smaller value of the maximum number of the vectors that are allowed to be operated and the number of the vectors that need to be operated currently as a number of the single vector operations.

10. The system according to claim 8, wherein the step of processing, by the convolution control unit, the corresponding vector data in the vector processing unit on the basis of the vector instruction comprises: in response to that the vector register has data, a shadow register of the vector processing unit is empty, and the convolution control unit allows, caching the vector data from the vector register to the shadow register; sequentially performing reordering processing and preprocessing on the vector data in the shadow register, and storing the vector data in a multiplier input cache of the vector processing unit; acquiring, by a multiplier array of the vector processing unit, the vector data from the multiplier input cache, so as to perform a multiplication operation under the control of the convolution control unit; acquiring, by a product accumulator of the vector processing unit, the vector data from the multiplier array, so as to perform an accumulation operation under the control of the convolution control unit; and acquiring, by a vector activation unit of the vector processing unit, the vector data from the product accumulator, so as to perform a non-linear vector operation by using a lookup table under the control of the convolution control unit.

11. A non-transitory computer-readable storage media, storing one or more computer-readable instructions, wherein when the computer-readable instruction is executed by one or more processors, the one or more processors are configured to:

acquire an instruction and data of artificial intelligence inference by means of a Direct Memory Access (DMA) interface, and write the instruction and the data into a memory;

acquire the instruction from the memory and translating the instruction, and load the data from the memory to a corresponding register on the basis of the instruction;

in response to the instruction being a vector instruction, process, through a convolution control unit, corresponding vector data in a vector processing unit on the basis of the vector instruction; and feed back the processed vector data to complete inference.

12. The system according to claim 9, further comprising:
the DMA interface, configured to load the instruction and data of artificial intelligence inference in a Double Data Rate (DDR) Synchronous Dynamic Random Access Memory (SDRAM) to the vector data memory, or the instruction memory, or the scalar data memory.

13. The system according to claim 9, wherein the vector data memory, the instruction memory, and the scalar data memory are coupled each other.

14. The system according to claim 9, the processor comprises:
an instruction fetching unit, configured to read the instruction from the memory or the register,
an instruction decoding unit, configured to decode the instruction,
an instruction prediction unit, configured to predict a branch in the instruction.

15. The system according to claim 9, the processor further comprises:
a convolution control unit, configured to determine environmental parameters on the basis of a register configuration instruction in the instruction, wherein the environmental parameters comprise a vector effective bit width, a number of vector registers in each group, a register bit width, and a number of vectors that need to be operated currently.

16. The system according to claim 9, the processor further comprises:
a vector processing unit, configured to perform a vector operation.

17. The system according to claim 16, the processor further comprises:
a multiplier array, configured to perform convolution operation and matrix multiplication operation, and comprises a plurality of multiplier modules, and each multiplier module comprises 64 8-bit multipliers.

18. The system according to claim 9, the processor further comprises:
a plurality of arithmetic logic unit, configured to perform a scalar arithmetic operation or a logic operation.

19. The system according to claim 9, wherein the scalar register is 32-bit scalar register.

20. The system according to claim 9, wherein the vector register is a 32-bit vector register.

* * * * *